W. H. TUPPER.
MANUFACTURING ILLUMINATING GAS.
No. 189,971.   Patented April 24, 1877.
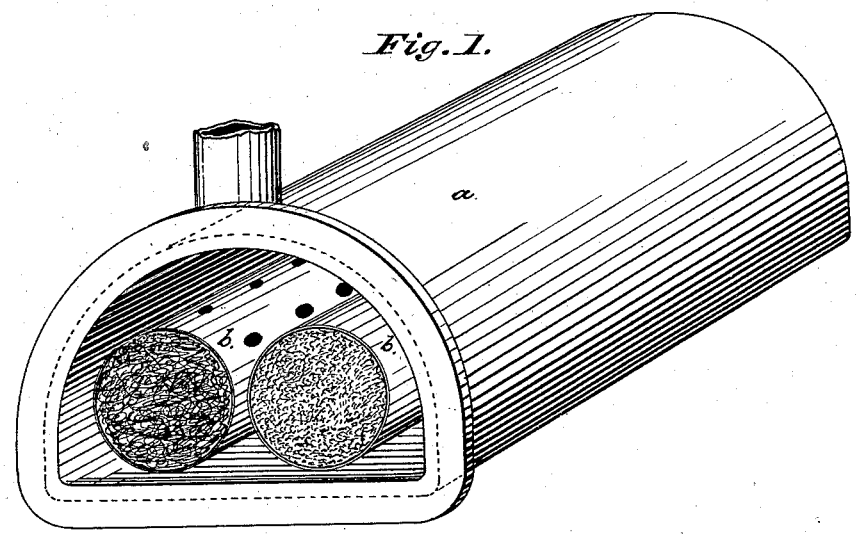
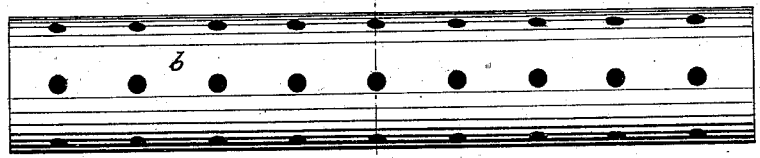
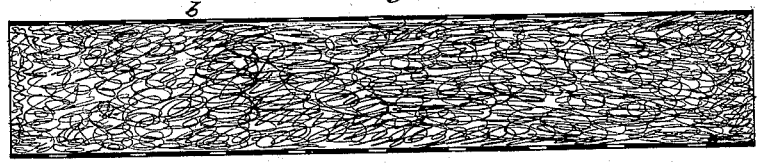
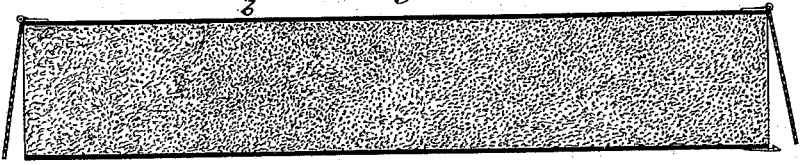
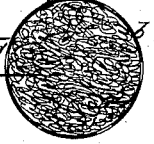 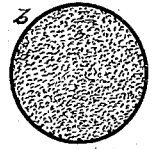

UNITED STATES PATENT OFFICE.

WILLIAM H. TUPPER, OF NEW YORK, N. Y., ASSIGNOR TO AMOS N. TITUS, OF SAME PLACE.

IMPROVEMENT IN MANUFACTURING ILLUMINATING-GAS.

Specification forming part of Letters Patent No. 189,971, dated April 24, 1877; application filed March 10, 1877.

*To all whom it may concern:*

Be it known that I, WILLIAM H. TUPPER, of New York city, in the county of New York and State of New York, have invented certain new and useful Improvements in Manufacturing Illuminating-Gas; and I do hereby declare that the following is a full, clear, and exact description thereof, which will enable others skilled in the art to which it appertains to make and use the same, reference being had to the accompanying drawings, and to the letters of reference marked thereon, which form a part of this specification, in which—

Figure 1 is a perspective of a retort containing the cartridges. Fig. 2 is a side view of a perforated charger or cartridge. Fig. 3 is a longitudinal section of a cartridge containing waste. Fig. 4 is a longitudinal cartridge containing sawdust. Figs. 5 and 6 are cross-sections of Figs. 3 and 4.

My present invention has reference to certain improvements on the patents granted to me in the months of April and May, 1876, and which had for their objects the utilization of the cotton or woolen waste which is extensively used about railways for stuffing the journal-boxes of cars, by making therefrom an illuminating-gas.

In my patent of May, 1876, I first treated the waste containing the oil with salt-water, for the purpose of relieving it of the objectionable elements resulting from the attrition of the journals in the alloyed bearings of the boxes. I next inclosed the cotton or woolen waste in a perforated cartridge or charger, closed at both ends for the purpose of preventing the inflammation of the waste while being charged into the retort.

In practicing my said two inventions for utilizing the refuse cotton or woolen waste, I have found that material advantages are obtained by distilling in the same retort, simultaneously, this cotton waste containing oil and a gas material yielding poor gas. The gas generated solely from the heavy oils contained in the cotton waste is so rich as to give forth considerable smoke and little illuminating power; but when there is distilled simultaneously with such rich gas a poor gas, the rich and poor so thoroughly commingle that as a result there is produced a gas possessing a high illuminating power. And I have also found that the inflammation of the waste, and consequent explosion, can be prevented by inclosing it in a cartridge or cylindrical shell, closed on its sides, and open at its ends, as well as it can be by inclosing it in a reticulated cartridge.

In my present invention I take the cotton or woolen waste containing oil, and mix with it a quantity of sawdust, spent tan, or other poor gas-producing material, and then insert the same into a charger or cartridge closed on all sides, but open at the ends. This cartridge, after being so filled, is put into an ordinary retort in a condition for generating gas. The cotton or woolen waste holds together the particles of the poor gas-producing material, and prevents them falling out at the ends of the cartridge. The gases from the two materials are generated simultaneously in the same retort and commingle one with the other, thereby producing a gas possessing superior illuminating power. The gas thus produced from this waste material has an increased illuminating power of some six to eight candle-power greater than that produced from oiled or greased cotton waste alone, and is in condition to be conducted through the necessary pipes to the cooler, purifier, and receiver; and it will be found that the gas thus made will require very little, if any, purification. The cotton or woolen waste, with which is mixed the poor gas-yielding material, can be put into a charger like that described in my patent of May last; but I find that if placed in a cartridge not perforated or reticulated, and open at both ends, the gas will be generated as satisfactorily as in my patent of May last. In my patent of May last I described only one form of cartridge—that being perforated or reticulated, and closed at one end, and having a perforated gate at the other. I find that if the body of the charger be solid, or, in other words, without perforations, and even open at both ends, the same purpose—to wit, the prevention of the inflammation of the cotton waste—will be answered, and it is the more fully to protect myself in that feature of my invention that I introduce and claim the change here.

In the accompanying drawing, the letter *a* indicates the retort; *b*, the charger or cartridge, of which there may be two, as shown, or only one. If two are used, the cotton waste containing the oil may be in one cartridge, and the poor gas-producing material in the other; or they may both be contained in the same cartridge. While this invention has reference to the perfect utilization of cotton waste containing oil, yet I can take any cotton or woolen material saturated with oil, and mixed with a poor gas-producing material, and generate therefrom a very excellent quality of gas.

Having described my invention, what I claim is—

1. The process of manufacturing gas which consists in distilling in the same retort cotton or woolen waste containing oil or grease, and sawdust or similar poor gas-yielding substance, substantially as described.

2. In the manufacture of illuminating-gas from cotton or woolen waste, the method of preventing the inflammation of the waste, which consists in inclosing said waste in a cartridge having closed sides, substantially as set forth.

3. In the manufacture of illuminating-gas, a charge for the retort composed of cotton or woolen waste containing oil or grease, and sawdust or similar material yielding poor gas by distillation, inclosed in a metallic cartridge, substantially as set forth.

In testimony that I claim the foregoing as my own I affix my signature in presence of two witnesses.

WILLIAM H. TUPPER.

Witnesses:
  B. F. EDSALL,
  GEORGE N. HALE.